US009786302B1

(12) United States Patent
Brown et al.

(10) Patent No.: US 9,786,302 B1
(45) Date of Patent: Oct. 10, 2017

(54) FLUX-GUIDED TUNNELING MAGNETORESISTIVE (TMR) SENSOR FOR MAGNETIC TAPE WITH REDUCED LIKELIHOOD OF ELECTRICAL SHORTING

(71) Applicant: HGST Netherlands B.V., Amsterdam (NL)

(72) Inventors: Diane L. Brown, San Jose, CA (US); Cherngye Hwang, San Jose, CA (US); David John Seagle, Morgan Hill, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/094,134

(22) Filed: Apr. 8, 2016

(51) Int. Cl.
*G11B 5/39* (2006.01)
*G11B 5/187* (2006.01)
*G11B 5/008* (2006.01)

(52) U.S. Cl.
CPC ........ *G11B 5/1871* (2013.01); *G11B 5/00813* (2013.01); *G11B 5/3909* (2013.01); *G11B 5/3912* (2013.01); *G11B 5/3916* (2013.01); *G11B 5/3925* (2013.01)

(58) Field of Classification Search
CPC ... G11B 5/3909; G11B 5/3912; G11B 5/3916; G11B 5/3925
USPC .............................. 360/319, 321, 322, 324.2
See application file for complete search history.

(56) References Cited

U.S. PATENT DOCUMENTS

| | | | |
|---|---|---|---|
| 5,898,547 A * | 4/1999 | Fontana, Jr. ......... | G11B 5/3169 360/321 |
| 6,344,954 B1 * | 2/2002 | Redon .................... | B82Y 10/00 360/321 |
| 6,519,124 B1 * | 2/2003 | Redon .................... | B82Y 10/00 360/321 |
| 6,597,546 B2 | 7/2003 | Gill | |
| 6,728,082 B2 | 4/2004 | Tabat et al. | |
| 6,744,608 B1 | 6/2004 | Sin et al. | |
| 7,036,208 B2 | 5/2006 | Ho et al. | |
| 7,170,721 B2 | 1/2007 | Wu | |
| 7,751,154 B2 | 7/2010 | Wu | |
| 7,952,839 B2 * | 5/2011 | Yamazaki ............. | B82Y 25/00 360/324.1 |
| 8,472,148 B2 | 6/2013 | Brown et al. | |
| 8,988,835 B1 | 3/2015 | Biskeborn et al. | |
| 9,001,473 B1 * | 4/2015 | Gao ..................... | G11B 5/3945 360/324.11 |
| 9,159,341 B2 | 10/2015 | Bradshaw et al. | |

(Continued)

*Primary Examiner* — Jefferson Evans
(74) *Attorney, Agent, or Firm* — Thomas R. Berthold

(57) ABSTRACT

A tunneling magnetoresistive (TMR) read head for magnetic tape has a tape-bearing surface (TBS) and includes a first magnetic shield, a first gap layer on the first shield, a TMR sensor on the first gap layer and recessed from the TBS, a second gap layer on the TMR sensor, a second magnetic shield on the second gap layer, and a magnetic flux guide between the first and second gap layers between the TBS and the recessed TMR sensor. The first gap layer has an insulating portion with an edge at the TBS and a non-magnetic electrically-conducting portion recessed from the TBS, with the TMR sensor located on the conductive portion. The sense current is between the two shields. An insulating isolation layer may be located between the first gap layer and the first shield layer with the sense current being between the second shield and the first gap layer.

13 Claims, 5 Drawing Sheets

(56) References Cited

U.S. PATENT DOCUMENTS

| | | | |
|---|---|---|---|
| 2001/0040777 A1* | 11/2001 | Watanabe | B82Y 10/00 360/321 |
| 2002/0048126 A1* | 4/2002 | Shimazawa | B82Y 10/00 360/324.2 |
| 2002/0114110 A1* | 8/2002 | Katakura | B82Y 10/00 360/321 |
| 2003/0137780 A1* | 7/2003 | Fontana, Jr. | B82Y 10/00 360/324.2 |
| 2003/0137781 A1* | 7/2003 | Carey | B82Y 10/00 360/324.2 |
| 2011/0019313 A1* | 1/2011 | Brown | B82Y 10/00 360/321 |

* cited by examiner

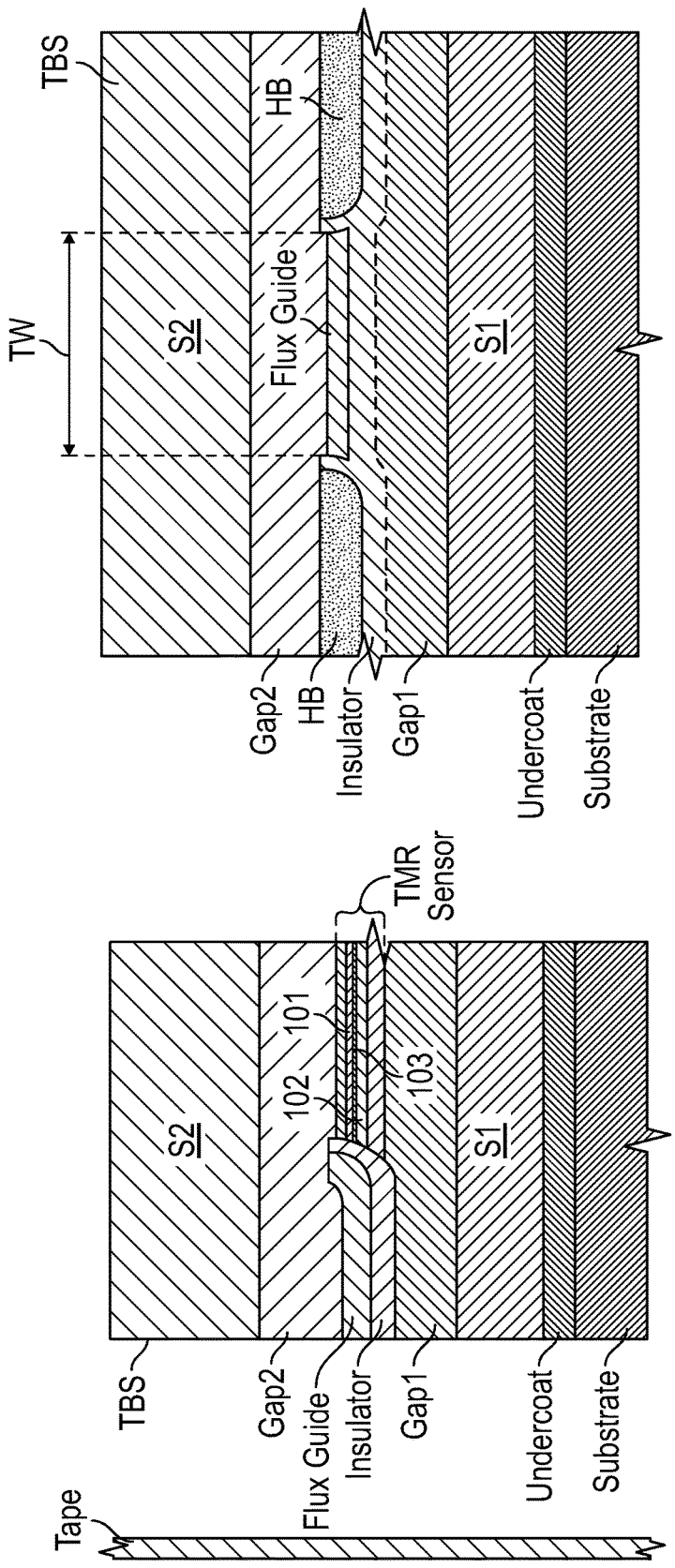

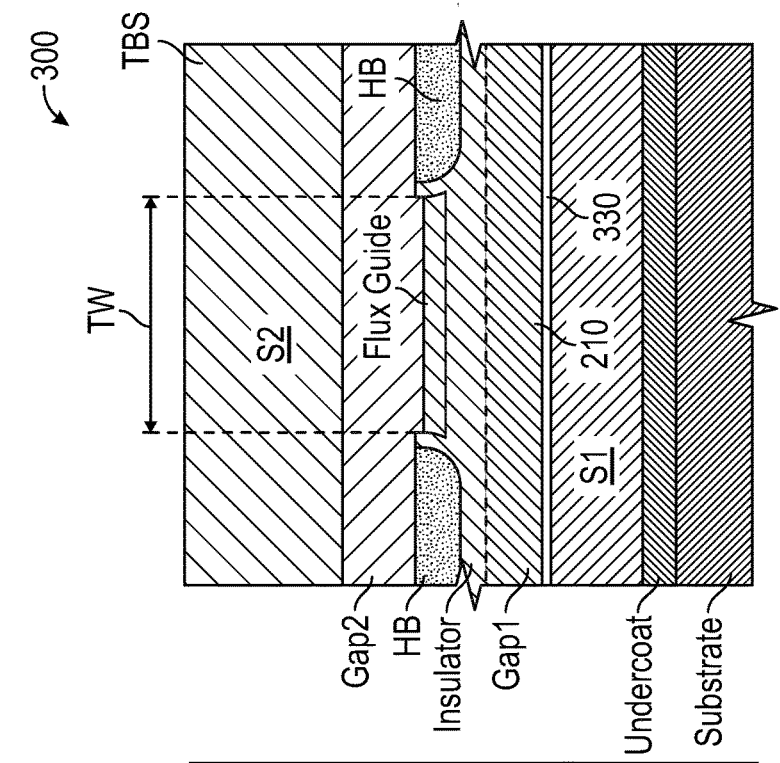
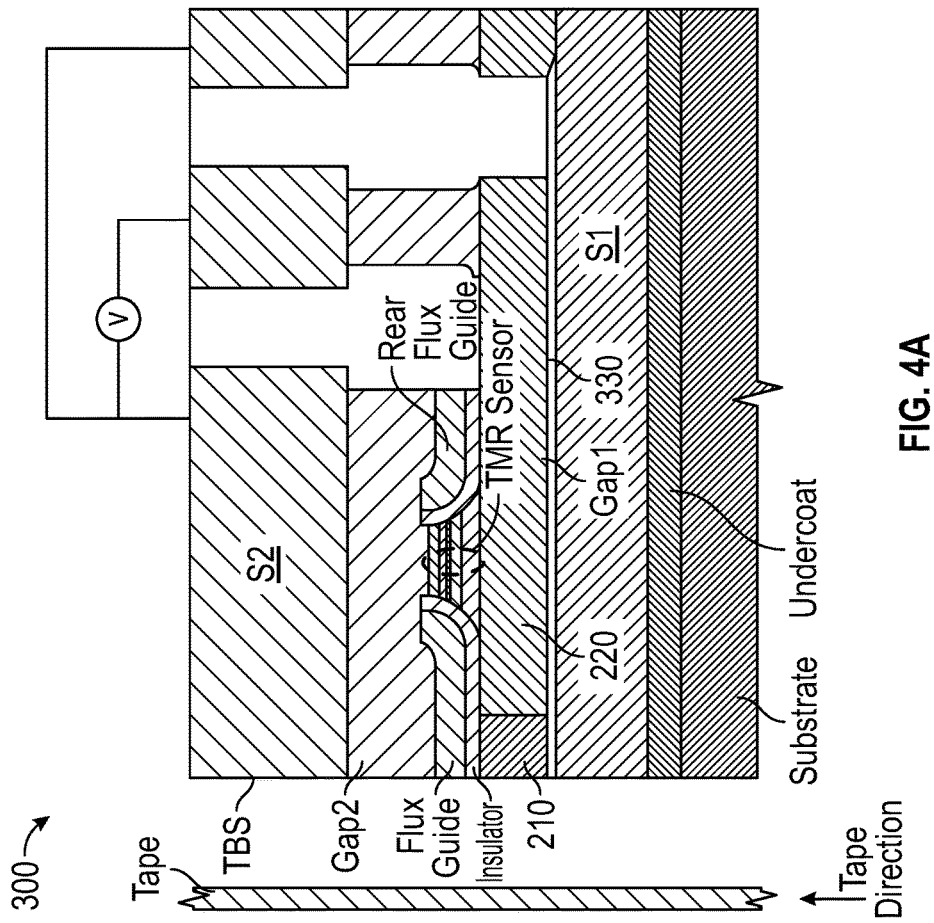
FIG. 4A
FIG. 4B

FLUX-GUIDED TUNNELING MAGNETORESISTIVE (TMR) SENSOR FOR MAGNETIC TAPE WITH REDUCED LIKELIHOOD OF ELECTRICAL SHORTING

BACKGROUND OF THE INVENTION

Field of the Invention

The invention relates generally to a read head for magnetic tape, and more particularly to a tunneling magnetoresistive (TMR) type of read head with a flux guide for directing magnetic flux from the magnetic tape to the TMR sensor.

Background of the Invention

One proposed type of magnetoresistive sensor used as the read head in magnetic recording tape drives is a magnetic tunnel junction sensor, also called a tunneling MR or TMR sensor. A TMR sensor has a stack of layers that includes two ferromagnetic layers separated by a tunneling barrier layer, i.e., a nonmagnetic electrically insulating spacer layer, which is typically MgO. One ferromagnetic layer adjacent the tunneling barrier layer has its magnetization direction fixed, such as by being pinned by exchange coupling with an adjacent antiferromagnetic layer, and is referred to as the reference layer. The other ferromagnetic layer adjacent the tunneling barrier layer has its magnetization direction free to rotate in the presence of external magnetic fields from recorded data on the tape and is referred to as the free layer. With a sense current applied perpendicularly through the sensor layers, the rotation of the free-layer magnetization relative to the reference-layer magnetization due to the presence of external magnetic fields is detectable as a change in electrical resistance.

U.S. Pat. No. 8,472,148 B2, assigned to the same assignee as this application, describes a magnetic tape read head with a TMR sensor and a flux guide that directs magnetic flux from the tape-bearing surface (TBS) of the read head to the TMR sensor, which is recessed from the TBS. The flux guide is formed on an insulating layer and the flux guide and insulating layer are located between two non-magnetic electrically conducting gap layers, with the edges of the flux guide, insulating layer and gap layers being exposed at the TBS. The insulating layer electrically separates the two conductive gap layers so that all of the sense current is directed through the TMR sensor.

Magnetic tapes typically use particulate media, which is abrasive and can cause scratching of the TBS. The scratching of the edges of the gap layers and insulating layer can result in a conductive path across the insulating layer, which can cause an electrical short of the sense current.

What is needed is a tape head with a TMR sensor and flux guide that is less likely to cause an electrical short in the presence of scratches of the TBS.

SUMMARY OF THE INVENTION

Embodiments of the invention relate to a tunneling magnetoresistive (TMR) read head with a flux guide for reading magnetically recorded data from a magnetic tape. The tape head has a tape-bearing surface (TBS) and includes a first (lower) magnetic shield layer, a first gap layer on the first shield layer, a TMR sensor on the first gap layer and recessed from the TBS, a second gap layer on the TMR sensor, a second (upper) magnetic shield layer on the second gap layer, and a magnetic flux guide layer between the first and second gap layers and extending between the TBS and the recessed TMR sensor. An insulating layer separates the flux guide from the first gap layer.

In a first embodiment the first gap layer has a non-electrically-conducting portion with an edge at the TBS and a non-magnetic electrically-conducting portion recessed from the TBS, with the TMR sensor being located on the conductive portion recessed from the TBS. The sense current is between the first and second shield layers through the TMR sensor. Because there is no electrically-conductive gap material at the TBS between the flux guide and the first shield layer, and because the non-electrically-conducting portion of the first gap layer at the TBS provides increased separation between the edge of the flux guide and the first shield layer, there is less likelihood that a scratch at the TBS will create a conductive bridge between the flux guide and the first shield layer, which would short the sense current.

In a second embodiment an insulating isolation layer is located between the first gap layer and the first shield layer. The sense current is between the second shield layer and the first gap layer through the TMR sensor and does not pass through the first shield layer. The first and second shield layers can be connected in a region behind the TMR sensor so that they are at the same electrical potential. Thus even if a scratch at the TBS were to cause conductive material from the first shield layer to bridge the isolation layer and the insulating portion of the first gap layer, there would be no shorting of the sense current because the sense current is between the conductive portion the first gap layer and the second shield layer. An optional protective overcoat may be formed on the TBS in both embodiments. However, an overcoat is undesirable because it increases the spacing between the edge of the flux guide and the magnetic tape. The second embodiment provides the additional advantage that eliminates the need for an overcoat on the TBS because a scratch at the TBS will not cause shorting of the sense current.

For a fuller understanding of the nature and advantages of the present invention, reference should be made to the following detailed description taken together with the accompanying figures.

BRIEF DESCRIPTION OF THE DRAWINGS

FIG. 1A is a schematic sectional view of a prior art tape head with a tunneling magnetoresistive (TMR) sensor and flux guide and shows the tape-bearing surface (TBS) as an edge.

FIG. 1B is a schematic view of the prior art tape head of FIG. 1A as viewed from the TBS.

FIG. 4A is a schematic sectional view of a second embodiment of the tape head according to the invention with a TMR sensor and flux guide and shows the TBS as an edge.

FIG. 4B is a view of the tape head of FIG. 4A as viewed from the TBS.

DETAILED DESCRIPTION OF THE INVENTION

Figures 2A, 2B:
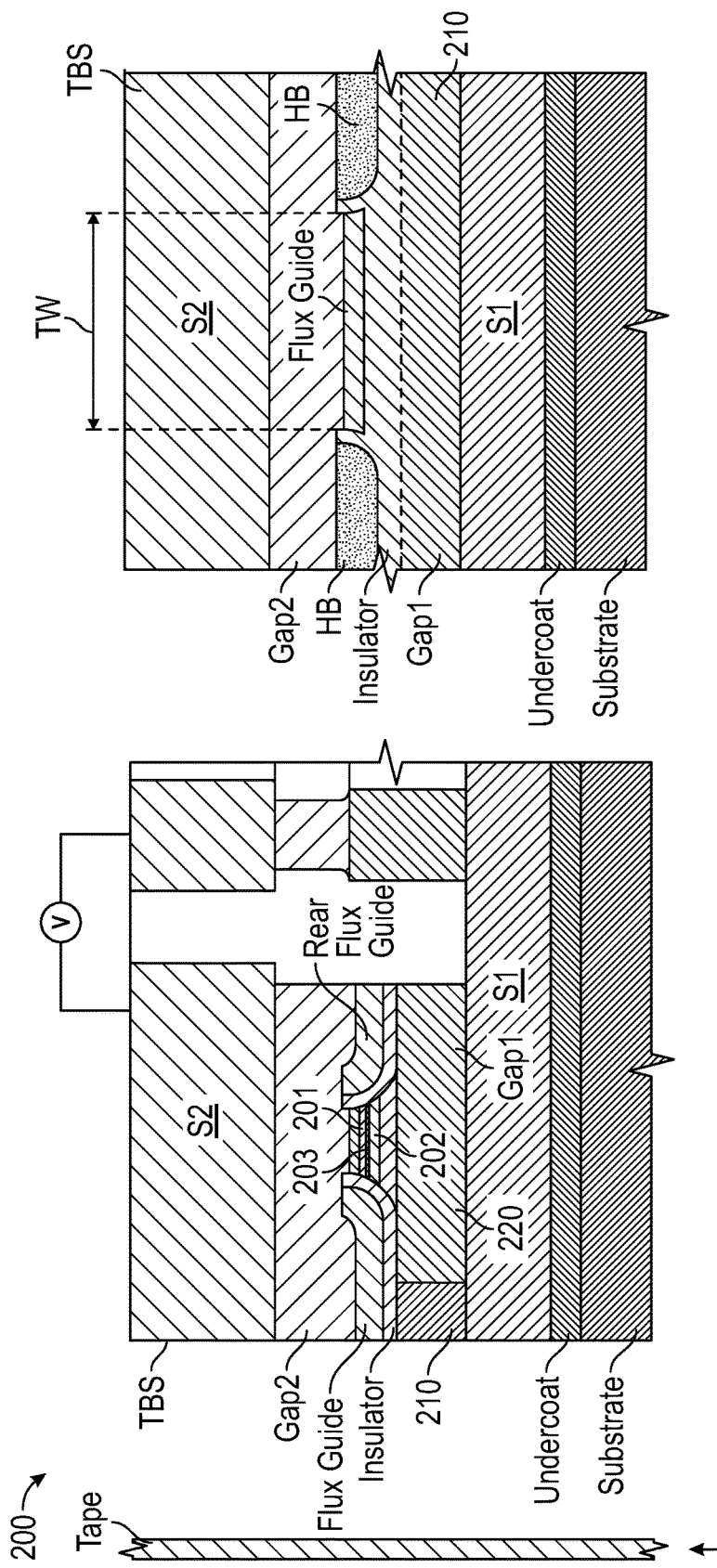
FIG. 2A is a schematic sectional view of a first embodiment of the tape head according to the invention with a TMR sensor and flux guide and shows the TBS as an edge.
FIG. 2B is a view of the tape head of FIG. 2A as viewed from the TBS.

FIG. 1A is a schematic sectional view of a prior art tape head with a TMR sensor and flux guide and shows the tape-bearing surface (TBS) as an edge. FIG. 1B is a view of the prior art tape head of FIG. 1A as viewed from the TBS. The prior art tape head and its fabrication process are described in U.S. Pat. No. 8,472,148 B2, assigned to the same assignee as this application.

The tape head is formed on a suitable substrate, such as a composite of aluminum-titanium carbide (AlTiC). A first shield (S1) of soft magnetic material, like a NiFe alloy, is deposited on an undercoat, typically alumina, on the substrate. A first gap layer (gap 1) of non-magnetic but electrically-conducting material is formed on S1. The TMR sensor, which includes free ferromagnetic layer 101, insulating tunnel barrier layer 102, which is typically MgO, and reference ferromagnetic layer 103 is deposited and patterned on gap 1. A second gap layer (gap 2) of non-magnetic but electrically-conducting material is formed above the TMR sensor, and a second shield (S2) of soft magnetic material is deposited on gap 2. The shields S1 and S2 shield the TMR sensor from magnetic bits on the tape adjacent the bit being read by the sensor.

As shown in FIG. 1A the TMR sensor is recessed from the TBS. A flux guide, typically formed of a NiFe alloy, is located between gap 1 and gap 2 and directs magnetic flux, received at the TBS from the magnetic tape, to the TMR sensor, specifically to the free layer 101. The flux guide is isolated from the conductive gap 1 by an insulating layer, which is typically alumina. The electrical path for the sense current is provided by S2, gap 2, the TMR sensor, gap 1 and S1. The TBS view of FIG. 1B also shows the track width (TW) of the TMR sensor and hard bias (HB) magnetic material at the TW side edges of the TMR sensor to longitudinally bias the magnetization direction of the free layer 101.

FIG. 1A shows the magnetic tape and its direction of travel past the edge of the flux guide at the TBS. The magnetic tape typically contains particulate magnetic media that can scratch the exposed material at the TBS when the tape comes into contact with the TBS. A scratch can cause conductive material from gap 1 to bridge the insulating layer below the flux guide and thus provide an electrical path for current other than through the TMR sensor.

FIG. 2A is a schematic sectional view of a first embodiment of the tape head according to the invention with a TMR sensor and flux guide and shows the tape-bearing surface (TBS) as an edge. FIG. 2B is a view of the tape head of FIG. 2A as viewed from the TBS.

The tape head 200 is formed on a suitable substrate, such as a composite of aluminum-titanium carbide (AlTiC). A first shield (S1) of soft magnetic material, like a NiFe alloy, is deposited on an undercoat, typically alumina, on the substrate. A first gap layer (gap 1) is made of two portions and is formed on S1. A first portion of gap 1 is non-conducting insulating portion 210 with an edge at the TBS. Portion 210 may be formed of alumina. A second portion of gap 1 is non-magnetic electrically-conducting portion 220 and is located below the TMR sensor. The TMR sensor, which includes free ferromagnetic layer 201, insulating tunnel barrier layer 202, which is typically MgO, and reference ferromagnetic layer 203 is deposited and patterned on portion 220 of gap 1. A second gap layer (gap 2) of non-magnetic but electrically-conducting material is formed above the TMR sensor, and a second shield of soft magnetic material is deposited on gap 2. The conductive portion 220 of gap 1 and gap 2 may be formed of a metal or metal alloy, preferably iridium (Ir) or alternatively ruthenium (Ru) or a nickel-chromium (NiCr) alloy.

As shown in FIG. 2A the TMR sensor is recessed from the TBS. A flux guide, typically formed of a NiFe alloy, is located between gap 1 and gap 2 and directs magnetic flux, received at the TBS from the magnetic tape, to the TMR sensor, specifically to the free layer 201. The flux guide is isolated from the conductive portion 220 of gap 1 by an insulating layer, which is typically alumina. The embodiment of FIG. 2A also shows an optional rear flux guide recessed from the TBS farther than the TMR sensor. FIG. 2A also shows that the sense circuitry that includes a voltage source has an electrical path for the sense current provided by S2, gap 2, the TMR sensor, conductive portion 220 of gap 1 and S1. The TBS view of FIG. 2B also shows the track width (TW) of the TMR sensor and hard bias (HB) magnetic material at the TW side edges of the TMR sensor to longitudinally bias the magnetization direction of the free layer 201. FIG. 2B also shows that there is no conductive gap material at the TBS between the flux guide and S1, as well as the increased separation between the edge of the flux guide and S1. Thus it is less likely that a scratch at the TBS will create a conductive bridge between the flux guide and S1. In a typical embodiment the spacing between S1 and S2 at the TBS may be about 100 nm, the thicknesses of gap 1 and gap 2 may each be about 30-40 nm and the thickness of the TMR sensor about 30 nm. The flux guide may have a thickness about 10 nm and the insulating layer below the flux guide a thickness about 3 nm. The TMR sensor may be recessed from the TBS by about 200 nm and the insulating portion 210 of gap 1 may extend from the TBS toward the TMR sensor for about 100 nm.

Figure 3A:
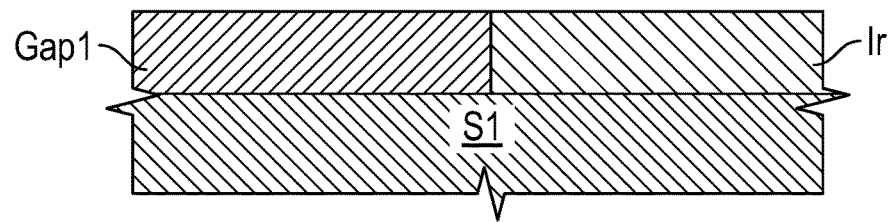
FIGS. 3A-3E are sectional views of process steps for forming the first gap layer (gap 1) of the first embodiment of the tape head according to the invention with an insulating portion and an electrically-conducting portion.
Figure 3B:
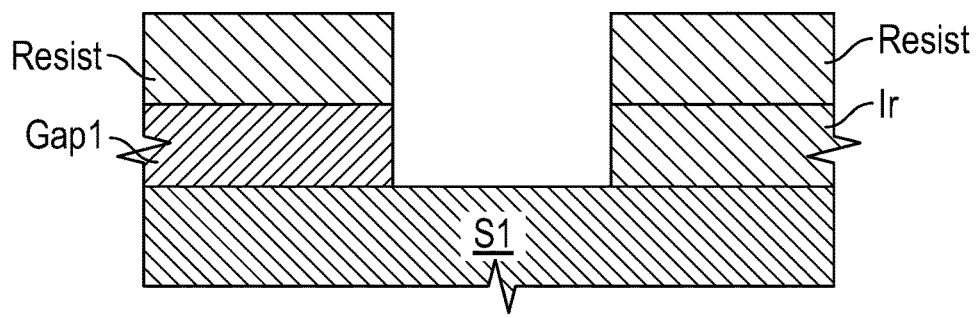
Figure 3C:
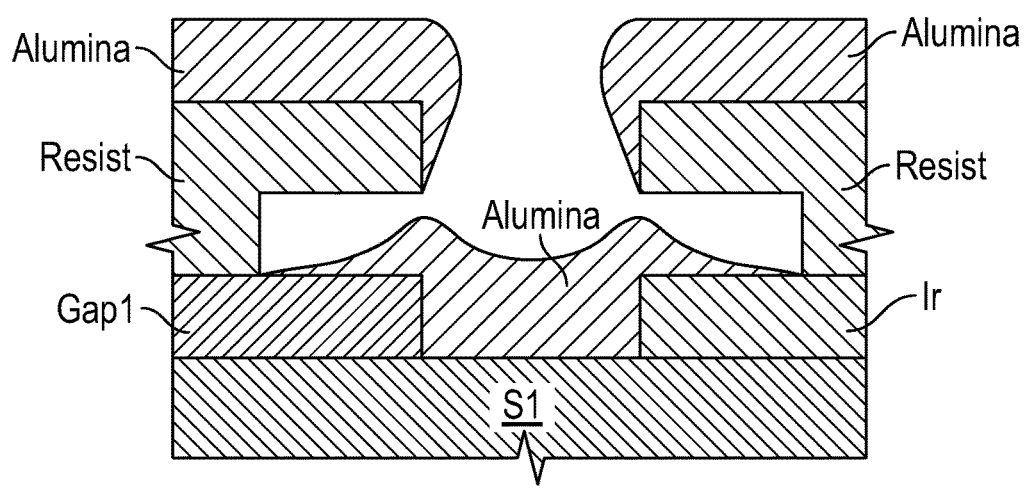
Figure 3D:
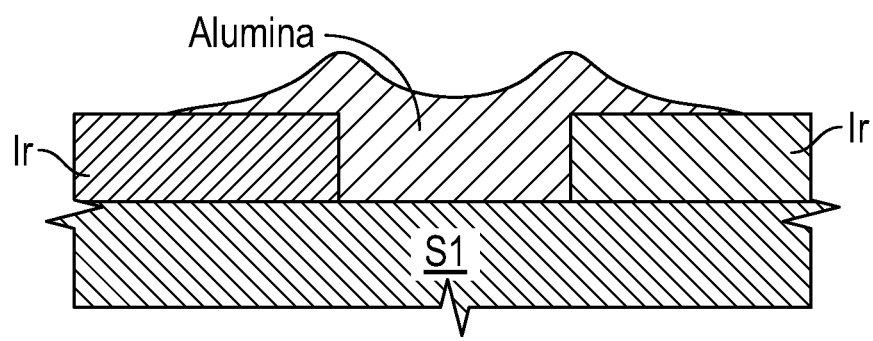
Figure 3E:
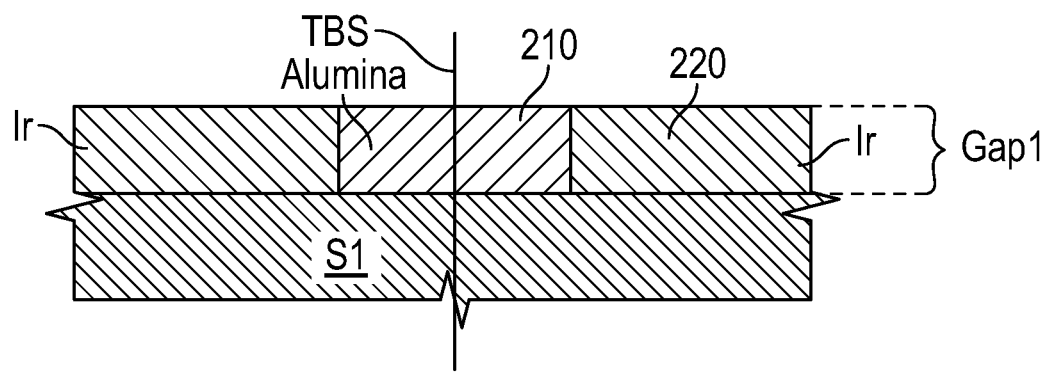

The process steps for making a tape head with a TMR sensor and flux guide are well known, as described for example in previously-cited U.S. Pat. No. 8,472,148 B2. FIGS. 3A-3E are sectional views of process steps for forming the first gap layer (gap 1) with insulating portion 210 and conducting portion 220. In FIG. 3A the material of gap 1, for example Ir, is sputter deposited on S1. In FIG. 3B, a layer of resist has been patterned and developed to define an opening, after which the exposed Ir of gap 1 is etched away. In FIG. 3C the resist of FIG. 3B is stripped away and a double layer of resist is deposited and developed, after which alumina is sputter deposited into the opening. In FIG. 3D, the resist has been stripped away. In FIG. 3E the alumina has been polished by chemical-mechanical polishing (CMP) down to the surface of the Ir. This forms the gap 1 layer with the insulating alumina portion 210 and the conducting Ir portion 220. The vertical line shows where the TBS will be formed after the TMR sensor layers and remaining layers of the tape head are formed and the structure is lapped to define the TBS.

FIG. 4A is a schematic sectional view of a second embodiment of the tape head according to the invention with a TMR sensor and flux guide and shows the tape-bearing surface (TBS) as an edge. FIG. 4B is a view of the tape head of FIG. 4A as viewed from the TBS. The tape head 300 is like the tape head 200 in FIGS. 2A-2B but includes an insulating isolation layer 330 between gap 1 and shield 1. The isolation layer 330 has an edge at the TBS and may be formed of alumina to a thickness of about 5 to 10 nm. FIG. 4A also shows that the sense circuitry that includes a voltage source has an electrical path for the sense current provided by S2, gap 2, the TMR sensor and conductive portion 220 of gap 1. The sense current does not pass through S1. FIG. 4A also shows an option that S1 and S2 can be connected in a region behind the TMR sensor so that S1 and S2 can be at the same electrical potential.

An optional protective overcoat, such as a 15 nm film of alumina, may be formed on the TBS in both embodiments. However, an overcoat is undesirable because it increases the spacing between the edge of the flux guide and the magnetic tape. The second embodiment provides the additional advantage that eliminates the need for an overcoat on the TBS. This is because S1 and S2 are at the same electrical potential. Thus even if a scratch at the TBS were to cause NiFe material from S1 to bridge the isolation layer 330 and the insulating portion 210 of gap 1, there would be no shorting of the sense current because the sense current is between conductive portion 220 of gap 1 and upper S2.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A read head for reading magnetically recorded data from a magnetic tape, the head having a tape-bearing surface (TBS) and comprising:
    a substrate;
    a first shield layer on the substrate;
    a first gap layer on the first shield layer and having a non-electrically-conducting portion with an edge at the TBS and a non-magnetic electrically-conducting portion recessed from the TBS;
    a TMR sensor on the non-magnetic electrically-conducting portion of the first gap layer and recessed from the TBS;
    a non-magnetic electrically-conducting second gap layer on the TMR sensor;
    a second shield layer on the second gap layer;
    a flux guide layer between the first and second gap layers and extending between the TBS and the recessed TMR sensor; and
    an insulating layer between the flux guide layer and the first gap layer;
    wherein the non-magnetic electrically-conducting recessed portion of the first gap layer and the non-magnetic electrically-conducting second gap layer are selected from Ir, Ru and a NiCr alloy.

2. The read head of claim 1 further comprising circuitry for directing sense current between the first and second shield layers perpendicularly through the TMR sensor.

3. The read head of claim 1 further comprising an insulating isolation layer between the first gap layer and the first shield layer.

4. The read head of claim 3 further comprising circuitry for directing sense current between the non-magnetic electrically-conducting recessed portion of the first gap layer and the second shield layer perpendicularly through the TMR sensor.

5. The read head of claim 4 wherein the first and second shields are connected in a region recessed further from the TBS than the TMR sensor and wherein there is no protective overcoat on the TBS.

6. The read head of claim 1 wherein the non-electrically-conducting portion of the first gap layer is formed of alumina.

7. The read head of claim 1 further comprising a rear flux guide recessed from the TBS farther than the TMR sensor.

8. The read head of claim 1 further comprising a protective overcoat formed on the TBS.

9. A tunneling magnetoresistive (TMR) read head for reading magnetically recorded data from a magnetic tape, the head having a tape-bearing surface (TBS) and comprising:
    a substrate;
    a first shield layer on the substrate;
    an insulating isolation layer on the first shield layer;
    a first gap layer on the isolation layer and having a non-electrically-conducting portion with an edge at the TBS and a non-magnetic electrically-conducting portion recessed from the TBS;
    a tunneling magnetoresistive (TMR) sensor on the non-magnetic electrically-conducting portion of the first gap layer and recessed from the TBS;
    a non-magnetic electrically-conducting second gap layer on the TMR sensor;
    a second shield layer on the second gap layer, the first and second shield layers being connected in a region recessed farther from the TBS than the TMR sensor;
    a flux guide layer between the first and second gap layers and extending between the TBS and the recessed TMR sensor;
    an insulating layer between the flux guide layer and the first gap layer; and
    sense current circuitry connected between the second shield layer and the electrically-conducting recessed portion of the first gap layer.

10. The read head of claim 9 wherein each of the non-magnetic electrically-conducting recessed portion of the first gap layer and the second gap layer are selected from Ir, Ru, and a NiCr alloy.

11. The read head of claim 9 wherein the non-electrically-conducting portion of the first gap layer is formed of alumina.

12. The read head of claim 9 wherein the isolation layer is formed of alumina.

13. The read head of claim 9 further comprising a rear flux guide recessed from the TBS farther than the TMR sensor.

* * * * *